Patented Nov. 15, 1949

2,487,986

UNITED STATES PATENT OFFICE 2,487,986

REACTION OF BICYCLO-OLEFINS WITH ALKYL HALIDES

Louis Schmerling, Riverside, Ill., assignor to Universal Oil Products Company, Chicago, Ill., a corporation of Delaware No Drawing. Application April 3, 1944, Serial No. 529,410

8 Claims. (Cl. 260—648)

This application is a continuation-in-part of my co-pending application Serial No. 475,962 filed February 15, 1943 now Patent No. 2,436,058 dated February 17, 1948.

This invention relates to reactions of alkyl halides with bicyclo-olefins in the presence of a catalyst of the Friedel-Crafts type. More specifically the process is concerned with a method for interacting bicyclo-(2,2,1)-heptene-2 with an alkyl halide in the presence of a Friedel-Crafts type catalyst to form halobicycloheptanes and halo-alkyl-bicycloheptanes.

An object of this invention is the condensation of a bicyclo-olefin with an alkyl halide to form a halo-alkyl-bicycloparaffin with a molecular weight equal to the sum of the molecular weights of said bicyclo-olefin and alkyl halide.

Another object of this invention is the production of a halobicyclo-alkane by the interaction of a bicyclo-olefin and an alkyl halide in the presence of a catalyst of the Friedel-Crafts type.

A further object of this invention comprises a process for condensing in the presence of a Friedel-Crafts type catalyst a bicyclo-(2,2,1)-heptene-2 with a tertiary alkyl halide containing a halogen with an atomic weight of from about 35 to about 80.

One specific embodiment of the present invention comprises a process for reacting a bicycloheptene and an alkyl halide in the presence of a catalyst comprising as its essential active ingredient a Friedel-Crafts type halide.

A further embodiment of the present invention comprises a process for interacting bicyclo-(2,2,1)-heptene-2 and tertiary butyl chloride in the presence of a chloride catalyst of the Friedel-Crafts type.

A still further embodiment of the present invention comprises the condensation of bicyclo-(2,2,1)-heptene-2 and a tertiary butyl halide, in which the halogen has an atomic weight of from about 35 to about 80, in the presence of an aluminum chloride catalyst.

Bicyclo-olefins utilizable as one of the starting materials for my process may be obtained from any source, but are readily obtainable by the condensation of a cyclic diolefin and an aliphatic mono-olefin under the influence of heat and pressure. Thus bicyclo-(2,2,1)-heptene-2 is obtainable by reacting ethylene with cyclopentadiene or with dicyclopentadiene at an elevated temperature and pressure, while alkylbicycloheptenes are similarly produced by reacting cyclopentadiene or dicyclopentadiene with propylene, butylenes, and higher boiling olefins.

Some alkyl halides are produced by direct addition of a hydrogen halide to a mino-olefinic hydrocarbon, said addition reaction being effected generally in the presence of a catalyst such as a Friedel-Crafts type metal halide, an acid such as sulfuric, or phosphoric acids, etc. Such an addition of a hydrogen halide to an olefin results in the production of a secondary alkyl halide from a non-tertiary olefin containing 2 or more carbon atoms per molecule and in the formation of a tertiary alkyl halide from a tertiary olefine such as isobutylene, trimethyl ethylene, etc. Primary alkyl halides also utilizable in the present process for producing alkylcycloalkyl halides are obtainable by other means such as the addition of a hydrogen halide to ethylene, the treatment of a primary alcohol with a hydrogen halide in the presence of a suitable catalyst such as zinc chloride, etc. Primary alkyl bromides may be obtained from a 1-alkene or alpha olefin by addition of hydrogen bromide in the presence of peroxides or sunlight. Aralkyl halides, as for example, benzyl chloride or bromide, which may also be employed in the process of this invention, may be prepared by halogenating alkyl aromatic hydrocarbons and by other means.

Alkyl chlorides and bromides are generally preferred for use in effecting condensation reactions with cyclo-olefinic hydrocarbons but alkyl iodides and fluorides may also be utilized, although not necessarily under the same conditions of operation, particularly when different cyclo-olefinic hydrocarbons are also involved in the production of various alkyl- and polyalkyl-cycloalkyl halides. The alkyl halides which I prefer to use in my process thus contain a halogen with an atomic weight of from about 35 to about 80.

Suitable catalysts for the process of this invention comprise halides of the Friedel-Crafts type and this group of catalysts include particularly substantially anhydrous ferric chloride, bismuth chloride, and zirconium chloride. The generally more reactive halides of this class such as aluminum chloride, aluminum bromide, boron fluoride, zinc chloride, etc., are also suitable for this process.

The conditions of operation utilizable with the different halide catalysts or halide catalyst mixtures may be different, depending upon the catalyst activity and other factors. The normally solid catalytic materials may be utilized as such; they may be dissolved in a suitable solvent such as nitromethane, nitrobenzene, carbon disulfide, etc.; or they may be composited with one another or disposed upon solid carriers or supporting materials to produce catalyst composites of desired activities. Suitable catalyst carriers or supports include both adsorptive and substantially nonadsorptive materials, for example, alumina, activated charcoal, crushed porcelain, raw and acid-treated clays, diatomaceous earth, pumice, firebrick, etc. The carriers should be substantially inert in the sense that substantially no interaction which is detrimental to the activity or selectivity of the catalyst composite occurs between the carrier and metal halide.

The reaction of an alkyl halide with a bicyclo-olefin in the presence of a Friedel-Crafts type catalyst comprises the condensation of said alkyl halide with said bicyclo-olefin and also the interaction of said alkyl halide and bicyclo-olefin whereby a halobicyclo-alkane and an iso-olefin are formed. The yields of these different products depend in part upon the reaction temperature as well as upon the nature and the activity of the catalyst and other factors.

The present process for interacting or condensing an alkyl halide with a bicyclo-olefin apparently involves the addition of the alkyl halide with a bicyclo-olefin to produce another halogenated hydrocarbon of higher molecular weight containing the total number of carbon atoms present in each of the starting materials. Tertiary butyl chloride, tertiary butyl bromide, and other alkyl halides undergo similar reactions with bicyclo-olefins and alkylbicyclo-olefins such as the bicycloheptenes and alkylbicycloheptenes, said hydrocarbons being formed by thermal condensation of cyclopentadiene or dicyclopentadiene with ethylene and its homologues. The reaction of t-butyl chloride with bicyclo-(2,2,1)-heptene-2 may be written as follows:

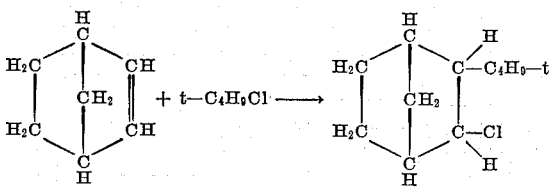

The interaction of a bicyclo-olefinic hydrocarbon with an alkyl halide in the presence of a halide catalyst of the Friedel-Crafts type at a condensation temperature is generally carried out at a pressure sufficient to insure substantially liquid phase operation. Thus in the presence of a bismuth chloride catalyst the reaction of tertiary butyl chloride with bicyclo-(2,2,1)-heptene-2 may be carried out at a temperature of from about 0° and about 50° C. although a temperature of from about 10° and about 30° C. is generally employed. On the other hand, when ferric chloride or aluminum chloride is the catalyst chosen, a temperature of from about −40° to about +40° C. may be employed, but temperatures below about 0° C. are generally preferred. Condensation reactions of the type herein set forth may be carried out at atmospheric pressure if the reactants are normally liquid. Halide catalysts of the Friedel-Crafts type other than those referred to above also require rather specifically defined temperatures in order to catalyze the condensation to form halo-alkylbicycloalkanes such as chlorinated alkylbicyclo-(2,2,1)-heptane.

In the reaction with bicyclo-olefins, primary, secondary, and tertiary alkyl halides are not necessarily utilizable under the same conditions of operation to produce halogenated bicyclo-alkane compounds.

The reaction of an alkyl halide with a bicyclo-olefin of the type herein set forth may be carried out using either batch or continuous types of operation. In batch type operation, desired proportions of alkyl halide and bicyclo-olefin are introduced to a reactor containing the halide catalyst or to which the halide catalyst is simultaneously introduced. The catalyst may be present as such or it may be composited with a carrier so that the commingled mixture of alkyl halide and bicyclo-olefin may be contacted therewith so that substantial proportions of the reactants are converted into the desired halobicyclo-alkanes and halo-alkyl bicycloalkanes. The reaction mixture, after separation from the catalyst, is fractionally distilled or otherwise treated to separate unconverted bicyclo-olefinic hydrocarbon and unconverted alkyl halide from the higher boiling reaction products. The recovered materials may then be used in another run.

Continuous operation of my process may be carried out by directing a mixture of a bicyclo-olefin and an alkyl halide through a reactor of suitable design containing the catalyst. In this type of treatment, the operating conditions may be adjusted suitably and these may differ somewhat from those employed in the batch type treatments. Thus, when a mixture of an alkyl halide and a bicyclo-heptene is passed through a reactor containing, for example, ferric chloride or ferric chloride supported by granular porcelain, the formation of desired products such as halo-bicyclo-heptane and halo-alkylbicycloheptane may be effected by using a higher temperature and shorter time of treatment than required for effecting similar conversion by contacting a similar reaction mixture and catalyst at a lower temperature in a batch type reactor, such as a pressure vessel or autoclave provided with suitable stirring means.

In some cases, it may be advisable to commingle the charged alkyl halide and bicyclo-olefin or alkylbicylo-olefin with a substantially inert solvent such as a paraffinic hydrocarbon, for example normal pentane, or a nitroparaffin, for example nitromethane, and then to effect the reaction in the presence of this added solvent. Obviously, the solvent chosen should be one which does not undergo undesirable reactions at the operating conditions used and one which may be separated from the desired reaction products.

Different halobicyclo-alkanes such as halobicycloheptanes and halo-alkylbicycloheptanes produced by my process may be utilized for various purposes. They may be hydrolyzed to form alcohols or reacted with their alcohol hydrolysis product or with other alcohols by heating with the alcohol alone but preferably in the presence of an alkali-acting substance including magnesium oxide or magnesium hydroxide to form bicycloheptyl ethers such as the dibicycloheptyl ether which is known as dinorcamphanyl ether, and the methyl bicycloheptyl ether more specifically known as methyl norcamphanyl ether or 2-methoxy-(2,2,1)-bicycloheptane. These two ethers, both of which are new compounds, have the following formulae:

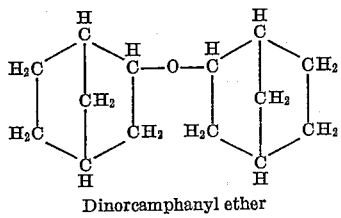
Dinorcamphanyl ether

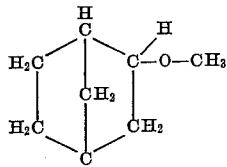
Methyl norcamphanyl ether

Also, the halo-alkylbicycloheptanes formed by condensation of an alkyl halide with a bicyclo-olefin may be dehydrohalogenated to alkylbicycloheptene hydrocarbons.

The following example is given to illustrate the character of results obtained by the use of the present process although the data presented are not introduced with the intention of restricting unduly the broad scope of the invention.

A mixture of 60 grams of bicyclo-(2,2,1)-heptene-2 and 60 grams of tertiary butyl chloride was stirred in a reactor cooled to 0° C. and 5 grams of substantially anhydrous ferric chloride was added to the cooled mixture. A vigorous reaction occurred during which some hydrogen chloride was evolved and the temperature of the reaction mixture increased rapidly to 25° C. The reactor containing the reaction mixture was then cooled to 0° C. and permitted to stand for one hour without stirring. The reactor was then removed from the cooling bath and stirring was again started. The reaction temperature increased to about 45° C. in 30 minutes and the reaction mixture was then cooled to 25° C. and kept at that temperature for an additional period of 30 minutes. The liquid product (109 grams) was then decanted from 9 grams of black catalyst sludge and the liquid was then washed, dried, and distilled. Distillation of 106 cc. of liquid product gave the fractions shown in the following table.

| Fraction No. | B. pt. at 9.5 mm. pressure, °C. | Vol., cc. | $n_D^{20}$ |
|---|---|---|---|
| 1 | below 30 | 30 |  |
| 2 | 50–52 | 30.4 | 1.4784 |
| 3 | 52–57 | 7.3 | 1.4760 |
| 4 | 57–89 | 14.7 | 1.4772 |
| 5 | 89–103 | 7.0 |  |
| 6 | 103–109 | 5.5 |  |
| 7 | 109–120 | 1.2 | 1.4831 |
| Residue |  | 8.2 |  |

Fractions 2 and 3 consisted essentially of 2-chlorobicyclo-(2,2,1)-heptane which I converted to the corresponding alcohol, β-norcamphanol, by heating at 240° C. with water and magnesium oxide. A by-product of this hydrolysis was norcamphanyl ether which had a melting point of 66–67° C. and a boiling point of 245–250° C. Also, I heated some of the 2-chlorobicyclo-(2,2,1)-heptane with methanol and magnesium oxide at 200° C. and obtained 2-methoxybicyclo-(2,2,1)-heptane which boiled at 50° C. at a pressure of 17 mm. of mercury and had a refractive index, $n_D^{20}$, of 1.4562.

Fractions 5 and 6 which solidified on cooling were crystallized from ether to give a crystalline material melting at 56–57° C. and consisting of 2-chloro-3-t-butyl-bicyclo-(2,2,1)-heptane.

The character of the invention and the type of results obtained are evident from the preceding specification and example, although they are not to be considered as imposing undue limitations upon its broad scope.

I claim as my invention:

1. A process which comprises reacting in the presence of a halide catalyst of the Friedel-Crafts type a bicyclo-(2,2,1)-heptene-2 and a tertiary alkyl halide wherein the halogen has an atomic weight of from about 35 to about 80 at a condensation temperature to produce a halobicycloheptane.

2. A process which comprises reacting a bicyclo-(2,2,1)-heptene-2 and a tertiary alkyl chloride in the presence of a halide catalyst of the Friedel-Crafts type at a condensation temperature to produce a chlorobicyclopentane.

3. A process which comprises reacting a bicyclo-(2,2,1)-heptene-2 and a tertiary alkyl bromide in the presence of a halide catalyst of the Friedel-Crafts type at a condensation temperature to produce a bromobicycloheptane.

4. The process of claim 2 further characterized in that said catalyst comprises aluminum chloride and said temperature is between about −40° C. and about +40° C.

5. The process of claim 2 further characterized in that said catalyst comprises ferric chloride and said temperature is between about −40° C. and about +40° C.

6. The process of claim 2 further characterized in that said catalyst comprises bismuth chloride and said temperature is between about 0° C. and 50° C.

7. A process which comprises reacting bicyclo-(2,2,1)-heptene-2 and tertiary butyl chloride in the presence of a ferric chloride catalyst at a condensation temperature to produce 2-chloro-3-t-butylbicyclo-(2,2,1)-heptane.

8. As a new composition of matter 2-chloro-3-t-butylbicyclo-(2,2,1)-heptane.

LOUIS SCHMERLING.

REFERENCES CITED

The following references are of record in the file of this patent:

UNITED STATES PATENTS

| Number | Name | Date |
|---|---|---|
| 2,153,513 | Coleman et al. | Apr. 4, 1939 |
| 2,345,573 | Bruson | Apr. 4, 1944 |

FOREIGN PATENTS

| Number | Country | Date |
|---|---|---|
| 46,529 | Switzerland | Feb. 18, 1908 |

OTHER REFERENCES

Simons et al., "Jour. Am. Ch. Soc." vol. 60, pp. 2956–7 (1938).

Simons et al., "Ind. & Eng. Chem.," vol 32, pp. 178–80 (1940).

Nenitzescu et al., "Annalen der Chemie," vol. 519, pp. 260–71 (1935).

Nenitzescu et al., "Ber. der deut. Chem. Gesell.," vol. 69 B, pp. 2706–7, (1936).

Ritter et al., "Jour. Am. Chem. Soc.," vol. 64, pp. 583–5 (1942).

Simons et al., "Jour. Am. Chem. Soc.," vol 65, pp. 1269–71 (1943).

Thomas, "Anhydrous Aluminum Chloride in Organic Chemistry," pp. 734–44, (1941).